United States Patent [19]
Snyder
[11] 3,869,585
[45] Mar. 4, 1975

[54] ASYMMETRIC QUADRATURE HYBRID COUPLERS

[75] Inventor: Richard V. Snyder, West Caldwell, N.J.
[73] Assignee: Lorch Electronics Corporation, Englewood, N.J.

[22] Filed: Dec. 19, 1972
[21] Appl. No.: 316,500

[52] U.S. Cl. .............................. 179/173, 333/24 R
[51] Int. Cl. .............................. H04m 1/00
[58] Field of Search ............ 179/173; 333/78, 24 R, 333/10, 32, 11

[56] References Cited
UNITED STATES PATENTS

| | | | |
|---|---|---|---|
| 3,426,298 | 2/1969 | Sontheimer et al. | 333/10 |
| 3,452,300 | 6/1969 | Cappucci et al. | 333/24 R |
| 3,484,724 | 12/1969 | Podell | 333/10 |
| 3,496,292 | 2/1970 | Waldelius | 179/173 |
| 3,514,722 | 5/1970 | Cappucci | 333/10 |

*Primary Examiner*—Kathleen H. Claffy
*Assistant Examiner*—Douglas W. Olms
*Attorney, Agent, or Firm*—Curtis, Morris & Safford

[57] ABSTRACT

The quadrature hybrid couplers hereof are simplified circuitally over prior equivalent couplers. Couplers have four ports, and are constructed with lumped impedances. These couplers are provided with asymmetric networks, that have electrical performance that is the same as that of symmetric ones. The couplers set forth are simpler in construction, have fewer parts, and are substantially smaller in volume.

11 Claims, 8 Drawing Figures

ASYMMETRICAL (2 CORE) COUPLERS

ASYMMETRICAL (2 CORE) COUPLERS

ASYMMETRIC QUADRATURE HYBRID COUPLERS

BACKGROUND AND SUMMARY OF THE INVENTION

The asymmetric couplers of the present invention are quadrature hybrid circuits with two pairs of ports. Quadrature hybrid couplers of the prior art have been formed with inductors and capacitors connected with two axes of symmetry. The circuitry of the preferred couplers hereof are asymmetrical with no axis of symmetry. The asymmetrical arrangements of the inductors and capacitors provide equivalent electrical coupling and specifications as the symmetrical networks they replace.

Primarily, the number of inductor forms or cores of the couplers hereof is significantly reduced. For example, a symmetrical network of the prior art that required six inductor forms is equivalently reconstructed herein asymmetrically using only two inductor forms. The result is a substantial reduction in manufacturing cost. Also, the asymmetric coupler is much smaller in volume, an important factor in many practical applications. It is emphasized that the quadrature hybrid performance of the asymmetric couplers have been found to be the same as the symmetrical ones they replace.

The asymmetrical quadrature couplers hereof are constructed to replace symmetrical devices in the many applications for them, now extant. Their inductors may be ferrite cored or with dielectric forms. Their circuits may be of lumped inductors and capacitors, or accomplished in flat printed form. Couplers of the present invention have already been built and used for frequencies at least as low as 5 megahertz, and up to 500 mHZ; in amplifier circuits that combine transistors optimally; in amplitude and phase equalizers of telephone systems; in filter and duplexing networks; in balanced mixer constructions; phase shifters; and numerous other equipment. In principle they can be constructed for use in microwave systems as well, including radar.

DESCRIPTION OF THE INVENTION

Figure 1:
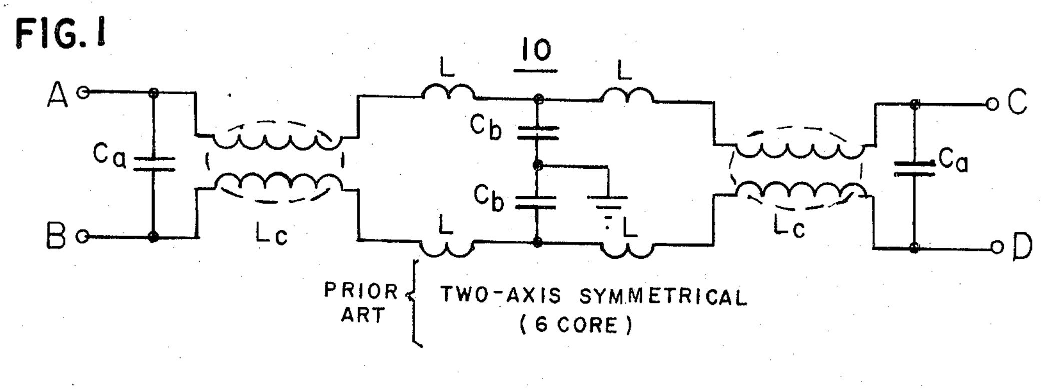
FIG. 1 is a circuit diagram of a typical two-axis symmetrical coupler network of the prior art, utilizing six inductor cores.

FIG. 1 is a circuit diagram of a quadrature or 90° hybrid "−3 db" coupler 10 of symmetric array, typical of the prior art devices. Coupler 10 has four conventional ports: A, B, C, and D. Using port A as the signal "input:" port D would be the "isolated" one at the say −30 db level; the signal appears at the "coupling" port B at −3 db at 0° phase difference (in-phase); and the signal is presented at "through" port C at −3 db at 90° phase relation (in quadrature).

The term "hybrid" means that any one of the four ports can instead be used as the "input" one (e.g., that would correspond to A as described above), and wherein the properties of the remaining three ports maintain the same relative positional and electrical relationship. For example, in FIG. 1 if port B were used for the "input," then: port C would be "isolated;" port A, the "coupling" one, at −3 db at 0°; and port D the "through" one, at −3 db at 90°.

It is noted that coupler 10 of FIG. 1 is symmetrical about two axes. Its capacitors and inductors (lumped or printed) are proportioned to provide the requisite signal transmission and electrical characteristics, in a manner understood by those skilled in the art. The operational signal performance is substantially uniform over its preset frequency range, e.g., over a band that is an octave or somewhat more. The signal level transmissions to its "coupling" and "through" ports are at the order of −3 db, and at 0° and 90° phase relation, respectively.

Figure 2:
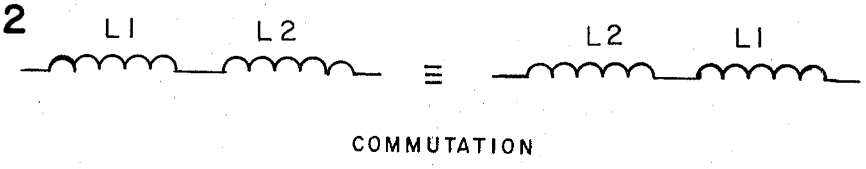
FIG. 2 presents the commutation principle for lumped inductors as used for the exemplary asymmetric couplers.
Figure 3:
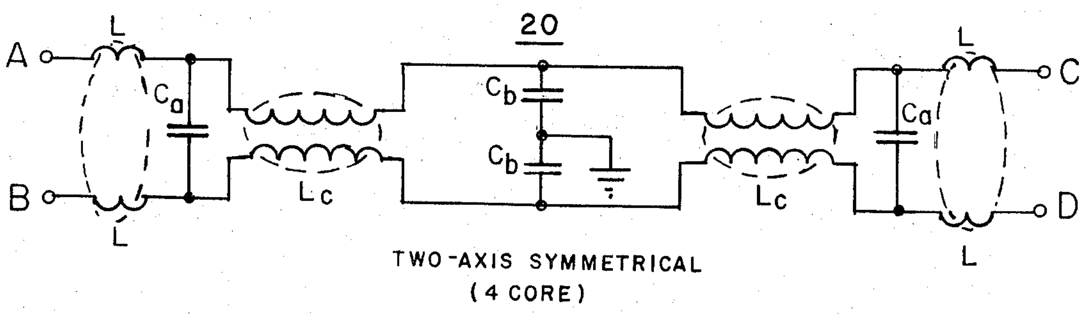
FIG. 3 is a two-axis symmetrical array corresponding to that of FIG. 1, reduced to four inductor cores in accordance with the present invention.
Figure 4:
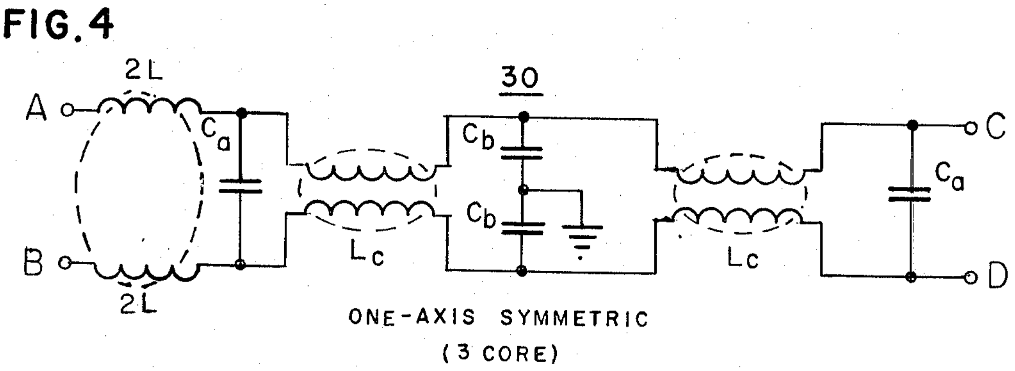
FIG. 4 illustrates a further reduction of the coupler networks of FIGS. 1 and 3 to one-axis symmetry, reduced to three inductor cores in accordance with the invention.
Figure 6A:
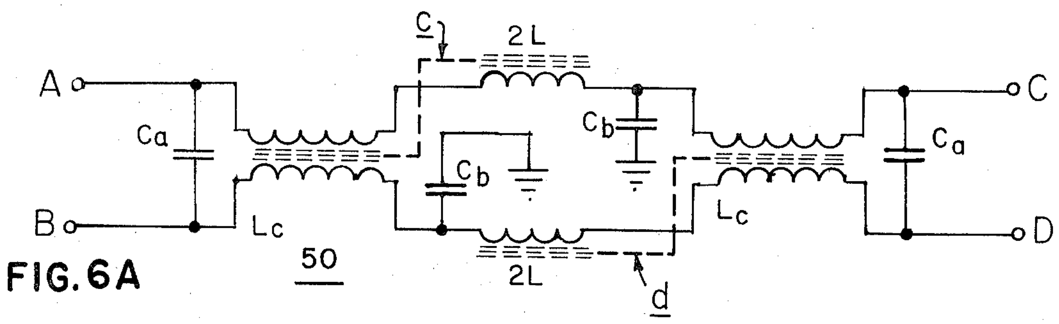
FIGS. 6A and 6B are modified arrangements of the FIG. 5 coupler, with circuits that simplify their production.
Figure 6B:
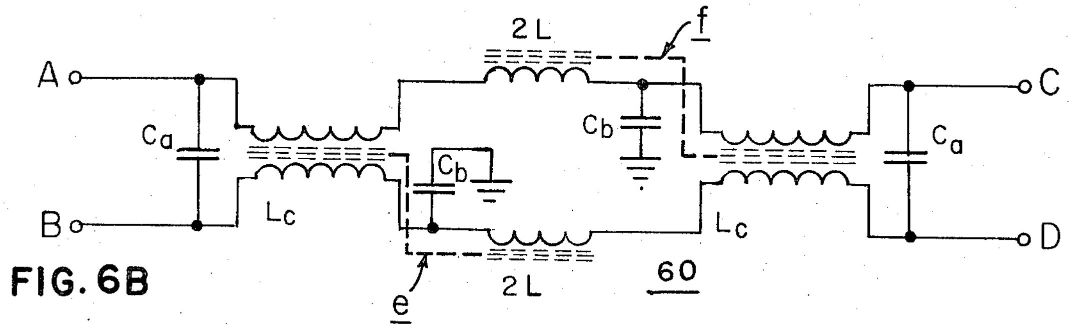
Figure 7:
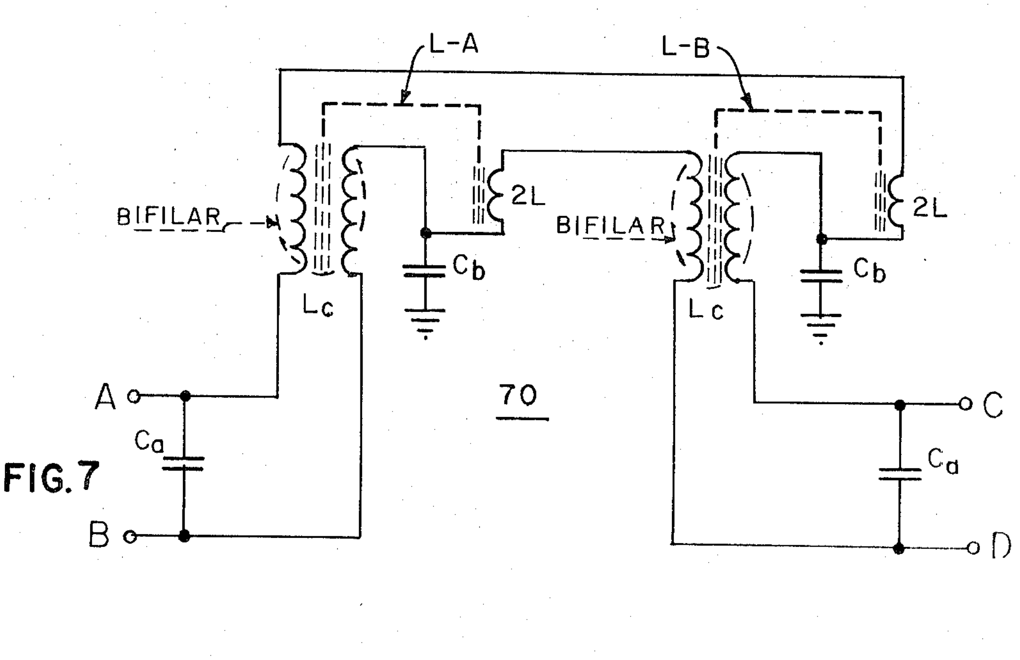
FIG. 7 is a schematic circuit diagram of an asymmetric quadrature hybrid coupler corresponding to that of FIG. 6B.

Generically, for the purposes of illustration, coupler 10 has capacitors $C_a$, $C_a$, and $C_b$, $C_b$; four inductors L, and two coupled inductor pairs $L_c$, $L_c$ as indicated by the dashed-line loops. This is a symmetric coupler that requires six coil forms or cores, and four capacitors. In analyzing its circuit (10) for circuit simplification in accordance with the present invention, reference is made to FIG. 2 for the basic principle used. It is readily shown that lumped inductors and capacitors, being non-dispersive and non-distributed, will commute from an ABCD matrix standpoint. This isomorphism is illustrated in FIG. 2 for two inductors: L1 and L2. A similar figure could be drawn for other lumped elements, as capacitors. Through the application of this principle four port simpler and asymmetric networks are developed herein, that are fully equivalent in port parameters to the full symmetric four port (10). The couplers of FIGS. 3 and 4 are reduced to four and three cores, respectively. The couplers of FIGS. 5 to 7 are the asymmetric equivalents of coupler 10, and require only two inductor core forms, albiet each has three coils thereon.

FIG. 1 illustrates the two axis-symmetric network (10) as a starting point, as stated. Due to the two mode propagating nature of this "coupled mode" device 10, if AB is excited symmetrically (+ and +), the terminals AB are theoretically uncoupled. Hence the top half AC can be treated independently from the bottom half BD. Applying the FIG. 2 matrix commutation principle to FIG. 1 (top half and bottom half), we obtain a first symmetrical varient, coupler 20 of FIG. 3. Device 20 can be built with four cores or inductor forms: the two $L_c$ sets, and each of two L coils paired as well as indicated by dashedline loops. Coupler 20 is further "reduced" by further applying the commutation principle of FIG. 2 to it. The result is coupler 30, a one-axis symmetric network, with the same electrical characteristics as original two-axis symmetrical coupler 10 of FIG. 1. Coupler 30 can be built with three or four cores or inductor forms. The four L coils of device 20 is herein replaced by two inductors (2L) each of twice their inductance. The capacitors remain in the same positions in couplers 20 and 30; the two coils (L) on one end of device 20 being thus integrated into the other end.

Figure 5:
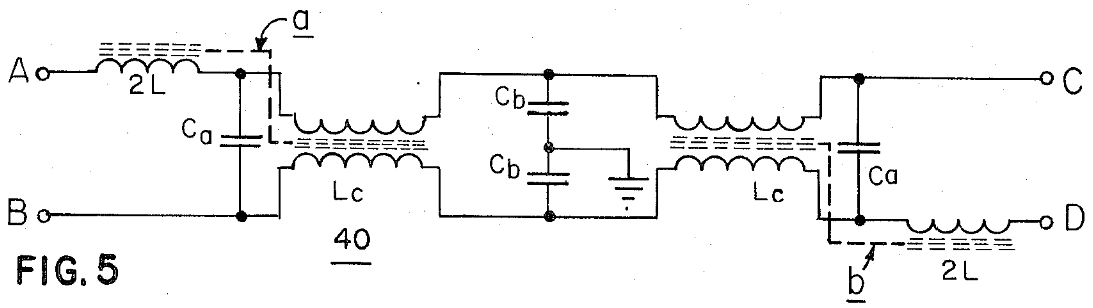
FIG. 5 is a circuit diagram of an exemplary coupler with two cores in asymmetric array.

The two core asymmetrical coupler 40 of FIG. 5 is derived by applying the FIG. 2 principle, as the dual mode network bisection. Coupler 40 has no axis of electrical symmetry, and is the first of the exemplary asymmetrical couplers hereof. The circuit of FIG. 5 is slightly harder to produce than couplers 50 and 60 of FIGS. 6A and 6B. This is because capacitors $C_b$, $C_b$ each have to be connected at an intersection of 2L and $L_c$. It is noted that the inductors 2L in symmetric location in coupler 30, are separated nonsymmetrically for coupler 40. The significant advantage now is that the two sets, each of three coils (2L and both of $L_c$) on each side of coupler 40, can be wound on a single core or coil form. This is schematically indicated by links *a* and *b* in FIG. 5.

The asymmetric couplers 50 and 60 are two-core asymmetrical networks, like coupler 40, but with both 2L coils moved into the central section per the commutation principle hereinabove set forth. Couplers 50, 60 are more readily constructed than is coupler 40 as their central capacitors $C_b$, $C_b$ are more easily connected with the coil circuitry, in manufacture. Coupler 50 of FIG. 6A has one coil set *c* with the paired $L_c$ and one 2L inductor on one core or coil form; and the related other coils $L_c$ and 2L as the set indicated at *d*. The same result is accomplished for coupler 60 of FIG. 6B by incorporating the opposite 2L coils with the two $L_c$ windings, as indicated at sets *e* and *f*.

The resultant networks 50 and 60 are quadrature hybrid couplers, identical in port properties to the original two-axis symmetric quadrature hybrid coupler 10 (FIG. 1), and also identical to couplers 20 and 30 (FIGS. 3 and 4), also modified symmetric quadrature hybrid networks. Even and odd mode anaylsis of the coupled sections shows that the even mode equivalent circuit is a series inductor, while the odd mode equivalent is a shunt capacitor. Actual construction of couplers 50 and 60 of FIGS. 6A and 6B requires that particular consideration be given to the form and substance of the inductors, to eliminate unwanted interaction between the 2L coils. In ferrite loaded construction, the permeability of the coil forms is chosen to be as low as possible and the core size as large as possible. Furthermore, the direction of winding is chosen such that adjacent currents flow in opposition, resulting in additional decoupling. This is illustrated in the schematic circuit of FIG. 7 for coupler 70 which corresponds in circuitry to coupler 60 of FIG. 6B.

The exemplary asymmetric coupler 70 is designed for the 136–184 megahertz range. It has two coil sets L-A and L-B. Each of the sets L-A and L-B has two inductance windings $L_c$, $L_c$ in bifilar array together with a monofilar coil 2L. These may be wound torroidally, or on a form of different shape. The bifilar coils $L_c$ hereof are both five turns of 2/34 standard twist 3200/16 (i.e. two strands of number 34 gauge copper wire, the strands at 3200 turns per 16 feet). The monofilar coil 2L is two turns of number 36 gauge wire. The inductor forms for coil sets L-A and L-B are of type U60 ferrite material. Capacitors $C_a$ are 15 picofarads (pfd); $C_b$, 6.8 pfd.

Typical test results on the couplers 70 over the 136–184 mHZ range showed the order of:

−3. db between ports AB;
−3.5 db between ports AC;
−30. db between ports AD.

The whole of exemplary coupler 70 can be sized to be readily mounted on a base that measures ⅝ inch in diameter, and fit within an enclosure 0.35 inch high; a volume that is compatible within a standard TO-5 transistor housing. Four leads from ports ABCD extend below the base, together with a fifth for ground. A cap or can protectively shields and seals the coupler within.

It has hereinabove been shown how to construct asymmetric type quadrature hybrid couplers, as well as simpler symmetric ones (20,30). The normal calculations for a symmetric structure are herein used as prototype for the variants disclosed. The resultant couplers hereof are smaller, and have equivalent electrical performance to the larger prior art devices that contain more components. The invention couplers can be constructed with lumped three-dimensional circuitry as set forth. Alternatively, such couplers may be made in essentially two-dimensional printed circuitry form, with flat serpentine or spiral inductors and with printed area capacitors, as will now be understood by those skilled in the art.

What is claimed is:

1. An asymmetric quadrature hybrid coupler comprising a first and a second pair of ports, a first pair of coupled inductors each inductor of which is in circuit with an individual port of said first port pair, a second pair of coupled inductors each inductor of which is in circuit with an individual port of said second port pair, a first series inductor in conductive electrical connection with one inductor of said first inductor pair, a second series inductor in conductive electrical connection with one inductor of said second inductor pair, said one inductor of said first inductor pair and said first series inductor being in conductive connection with the second inductor of said second inductor pair between corresponding ports of said port pairs, the second inductor of said first inductor pair and said second series inductor being in conductive connection with the said one inductor of said second inductor pair between the remaining corresponding ports of said first and second port pairs, said two series inductors and said two pairs of coupled inductors being the sole operative inductances of the coupler, being connected in electrical asymmetric array, and being electrically proportioned to provide effective performance as an asymmetric coupler that is equivalent to that of a corresponding symmetrical coupler.

2. An asymmetric quadrature hybrid coupler as claimed in claim 1, in which said first series inductor and said first inductor pair are wound on a first common core, and said second series inductor and said second inductor pair are wound on a second common core.

3. An asymmetric quadrature hybrid coupler as claimed in claim 2, in which said first and second cores are of torroidal form.

4. An asymmetric quadrature hybrid coupler as claimed in claim 3, in which the said torroidal cores are of ferrite material.

5. An asymmetric quadrature hybrid coupler as claimed in claim 2, in which said first and second inductor pairs are respectively wound in bifilar array.

6. An asymmetric quadrature hybrid coupler as claimed in claim 2, in which said first and second inductor pairs are wound in bifilar array on their respective said cores.

7. An asymmetric quadrature hybrid coupler as claimed in claim 6, in which the series inductor on each said core is a monofilar coil.

8. An asymmetric quadrature hybrid coupler as claimed in claim 1, in which the said first series inductor is in direct connection with the second inductor of said second inductor pair, and the said second series inductor is in direct connection with the second inductor of said first inductor pair.

9. An asymmetric quadrature hybrid coupler as claimed in claim 8, in which said first series inductor and said first inductor pair are wound on a first common core, and said second series inductor and said second inductor pair are wound on a second common core.

10. An asymmetric quadrature hybrid coupler as claimed in claim 1, in which the said first series inductor is in direct connection with its associated port, and the said second series inductor is in direct connection with its associated port.

11. An asymmetric quadrature hybrid coupler as claimed in claim 10, in which said first series inductor and said first inductor pair are wound on a first common core, and said second series inductor and said second inductor pair are wound on a second common core.

* * * * *